(12) United States Patent
Ogawa et al.

(10) Patent No.: US 6,714,540 B1
(45) Date of Patent: Mar. 30, 2004

(54) DATA COMMUNICATION METHOD, COMMUNICATION FRAME GENERATING METHOD, AND MEDIUM ON WHICH PROGRAM FOR CARRYING OUT THE METHODS ARE RECORDED

(75) Inventors: Noriyuki Ogawa, Hiroshima (JP); Yuko Saeki, Hiroshima (JP); Kuniaki Sugimoto, Hiroshima (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/251,906

(22) Filed: Feb. 19, 1999

(30) Foreign Application Priority Data

Feb. 25, 1998 (JP) .......................... 10/043824
Feb. 25, 1998 (JP) .......................... 10/043825

(51) Int. Cl.[7] .............................. H04L 9/22; H04L 29/06
(52) U.S. Cl. .................... 370/389; 370/465; 370/470; 375/370
(58) Field of Search ................. 370/389, 465, 370/468, 470, 503, 515, 522; 341/51, 94; 375/140, 141, 145, 367, 369, 370; 714/786, 787

(56) References Cited

U.S. PATENT DOCUMENTS

| | | | | |
|---|---|---|---|---|
| 4,577,327 A | * | 3/1986 | Nambu ........................ | 375/4 |
| 4,661,902 A | * | 4/1987 | Hochsprung et al. ....... | 364/200 |
| 4,827,517 A | * | 5/1989 | Atal et al. .................... | 381/41 |
| 5,335,233 A | * | 8/1994 | Nagy ........................... | 371/32 |
| 5,432,853 A | * | 7/1995 | Yamamoto .................. | 380/46 |
| 6,104,505 A | * | 8/2000 | Malik .......................... | 358/434 |

FOREIGN PATENT DOCUMENTS

| | | |
|---|---|---|
| EP | 0441963 A1 * | 8/1991 |
| EP | 0 886 410 | 12/1998 |
| WO | 97/42730 | 11/1997 |

OTHER PUBLICATIONS

Patent Abstracts of Japan, vol. 1995, No. 01, Feb. 28, 1995 & JP 06 291748 A (Hitachi Ltd; Others: 01), Oct. 18, 1994.
Patent Abstracts of Japan, vol. 008, No. 084 (E–239), Apr. 18, 1984 & JP 59 004360 A (Fujitsu KK), Jan. 11, 1984.

* cited by examiner

*Primary Examiner*—Alpus H. Hsu
(74) *Attorney, Agent, or Firm*—Wenderoth, Lind & Ponack, L.L.P.

(57) ABSTRACT

A control portion A transmits only a transmission right to a control portion B. The control portion B receives the transmission right sent from the control portion A, obtains transmission-requested data B from a utilization portion B, and then transmits it with the transmission right to the control portion A. The control portion A receives the data B and transmission right transmitted from the control portion B. If the control portion A is receiving a transmission request for data A from the utilization portion A at this time, it first obtains the transmission-requested data A from the utilization portion A and transmits it to the control portion B together with the transmission right. After transmitting the data A, the control portion A transfers the data B received from the control portion B to the utilization portion A.

14 Claims, 8 Drawing Sheets

F I G. 1
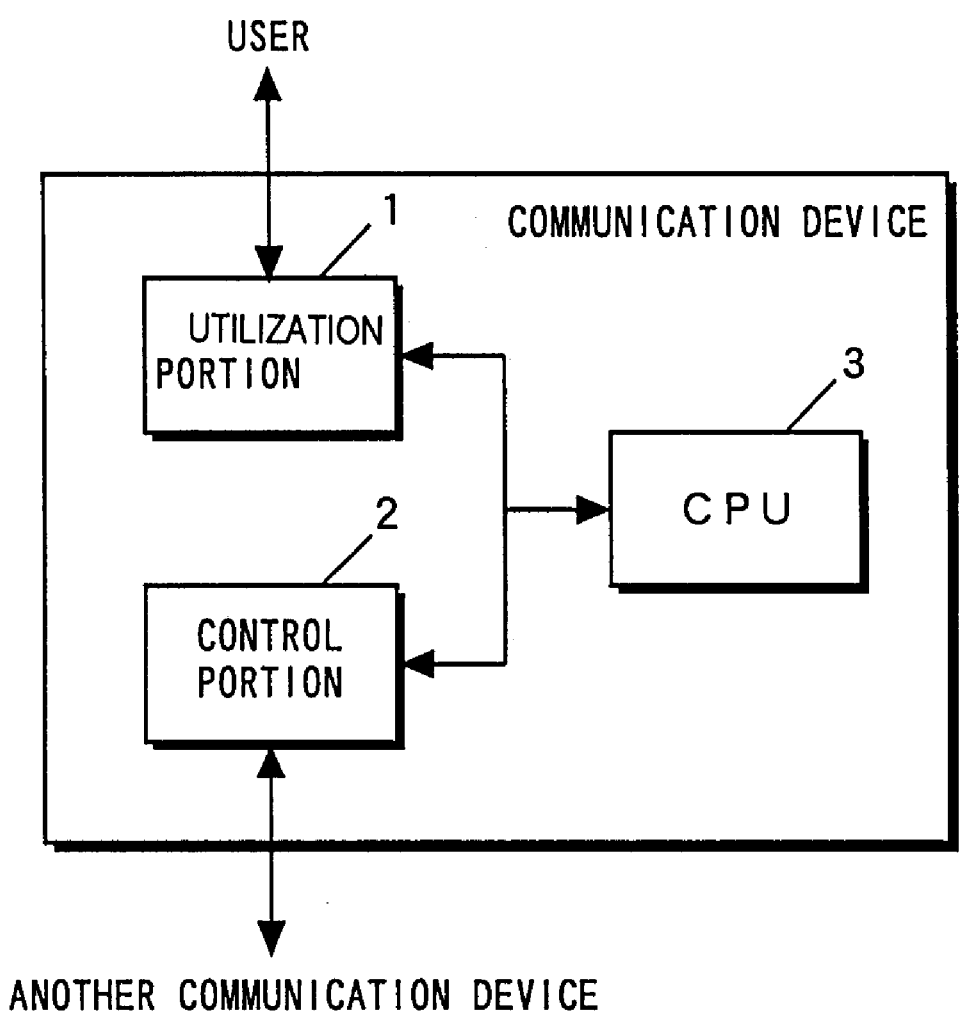

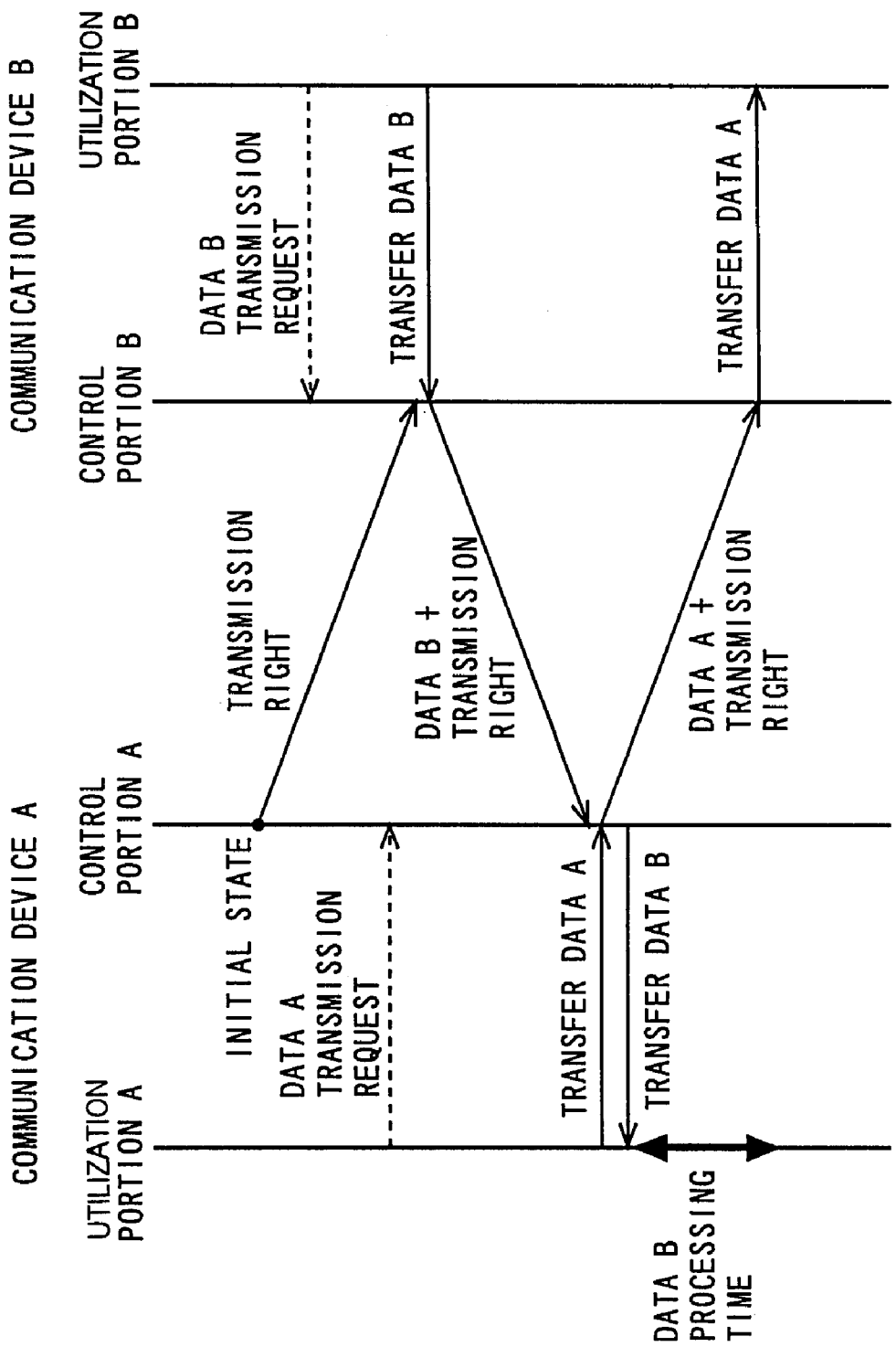
F I G. 3

DATA COMMUNICATION METHOD, COMMUNICATION FRAME GENERATING METHOD, AND MEDIUM ON WHICH PROGRAM FOR CARRYING OUT THE METHODS ARE RECORDED

BACKGROUND OF THE INVENTION

1. Field of the Invention

The present invention relates to a data communication method, a communication frame generating method, and a medium on which a program for executing the methods are recorded, and more particularly to a data communication method which prevents delay in data transmission in half duplex communication in a communication device having a utilization portion for executing application processings and a control portion for executing communication protocol processings, a communication frame generating method which prevents deterioration of data transmission (transfer) efficiency in asynchronous communications by radio and wire, and a medium on which program for carrying out the data communication method and the communication frame generating method are recorded.

2. Description of the Background Art

In a communication device having a utilization portion for executing application processings and a control portion for executing communication protocol processings, the utilization portion and the control portion exchange data in data transmission/reception. In data transmission, the utilization portion sends a data transmission request to the control portion. The control portion receives the data transmission request and then performs the processing of transmitting the data. In data reception, the control portion receives data and transfers the received data to the utilization portion. The utilization portion receives and processes the transferred data from the control portion.

Known data communication systems that perform between the communication devices generally include the full duplex communication system and half duplex communication system.

In the full duplex communication system, lines for transmission and reception are individually provided between communication devices, so that each communication device can freely transmit data without being affected by other communication devices. On the other hand, in the half duplex communication system, only a single line is provided between communication devices, so that a communication device cannot transmit data while the other communication device is transmitting data (therefore it receives the data).

Hence, in the half duplex communication system, a "transmission right" indicating which of the communication devices is the subject of the data transmission is generally transmitted/received together with the data. The half duplex communication system thus defines that only a communication device having the transmission right can perform data transmission.

Next, FIG. 8 shows an example of conventional data communication by half duplex performed between communication devices having utilization portions and control portions as described above. FIG. 8 is a diagram showing an example of a conventional communication sequence performed between communication devices A and B using the conventional data communication method. In FIG. 8, the utilization portion in the communication device A is represented as "utilization portion A" and its control portion as "control portion A," and the utilization portion in the communication device B is represented as "utilization portion B" and its control portion as "control portion B."

In the initial state, suppose that the transmission right resides in the communication device A and that a request for transmitting data B is occurring in the communication device B. First, the control portion A transmits only the transmission right to the control portion B, for it does not have a data transmission request at this time. The control portion B receives the transmission right sent from the control portion A, obtains the transmission-requested data B from the utilization portion B, and then transmits the data together with the transmission right to the control portion A. The control portion A then receives the data B and transmission right sent from the control portion B. Suppose that a request for transmitting data A is now occurring in the communication device A. In this case, the control portion A transfers the data B to the utilization portion A to preferentially process the data B transmitted from the control portion B. When receiving the data B, the utilization portion A processes the data B and then transfers the transmission-requested data A to the control portion A. Then, at last, the control portion A transmits the data A to the control portion B together with the transmission right.

In this conventional communication device, as stated above, application processing to received data (the data B) has priority over its own data transmission request processing (the data A). Accordingly its data transmission is delayed by the time the utilization portion (the utilization portion A) takes to process the received data (shown by the thick arrow in FIG. 8). In the case of systems for communications of audio data, moving picture data, etc. which seriously require the real-time property, such data transmission delay causes serious problems such as discontinuity of sound, blanks of image, etc.

Conventionally, there have been two kinds of systems for connecting a plurality of communication devices: synchronous communication system and asynchronous communication system. In these communication systems, communication devices generally transmit/receive information etc. by using communication frames. In the asynchronous communication system, communication timing of communication frames transmitted/received between communication devices is not synchronized. Therefore the communication devices use communication frames including start and end flags at the beginning and end so that they can recognize the beginning and end of each communication frame.

FIG. 9 shows an example of structure of a communication frame used in the asynchronous communication. Referring to FIG. 9, the communication frame used in the asynchronous communication includes address for identification of the destination communication device, data representing the transmitted information, etc., as well as the above-described start and end flags.

When receiving the start flag, the communication device checks the following address and then processes the information to the end flag. The communication device thus recognizes the beginning and the end of the communication frame in accordance with the start and end flags. If any address code or data code identical to the start or end flag exists, the communication device may erroneously recognize the beginning or end of the communication frame. To avoid this problem, the communication device applies transparency control to codes representing the same codes as the start and end flags.

In short, this transparency control means conversion of one value to another value. For example, if a code A identical to the start flag code is included in data, the code A is replaced by another code B (needless to say, the code B differs from the end flag code). The code after converted is generally provided with an extra identifier code so that the recipient can correctly recognize the data transparency-controlled on the sender. That is to say, the transparency-controlled code B is preceded by an identifier code to allow the recipient to determine whether the code B after transparency control is a transparency-controlled code B or the code B not transparency-controlled.

The following is a specific example of the transparency control method, in which address, data, etc. which are identical to the start flag code "C0h" and the end flag code "C1h" are converted. The letter "h" represents hexadecimal.

C0h→7Dh E0h
C1h→7Dh E1h
7Dh→7Dh 5Dh

In the example above, the one-byte code "C0h" is converted into the two-byte code "7Dh E0h," and the one-byte code "C1h" is converted into the two-byte code "7Dh E1h." The part "7Dh" corresponds to the identifier code. Note that the code "7Dh" used as the identifier code is converted into the two-byte code "7Dh 5Dh." If the code "7Dh" is left unchanged, then data not subjected to transparency control (e.g., "E0h") will be erroneously restored on the recipient in the presence of a normal data code "7Dh."

Thus the recipient can obtain the original codes by applying reverse transparency control only to codes preceded by the code "7Dh." The codes "E0h," "E1h," and "5Dh" not preceded by the code "7Dh" are thus not converted but left unchanged on the recipient.

However, in the above-described transparency control method, a one-byte code is converted to a two-byte code. Then the communication frame becomes longer as a larger number of codes are subjected to the transparency control, and then the communication will take longer time than required.

SUMMARY OF THE INVENTION

Therefore an object of the present invention is to provide a data communication method which eliminates delay in data transmission due to data processing time in an utilization portion to improve the data transmission efficiency and a medium on which a program for executing that method is recorded.

Another object of the present invention is to provide a communication frame generating method which suppresses expansion of length of communication frames after transparency control by previously avoiding application of the transparency control to codes which can arbitrarily be set, such as identification address, to prevent deterioration of the data transmission (transfer) efficiency and a medium on which a program for executing that method is recorded.

To achieve the objects above, the present invention has the following features.

A first aspect is directed to a data communication method for use in a communication device performing data communication by half duplex communication system and having utilization means for executing application processing and control means for executing communication protocol processing, the data communication method being performed by the control means. The method in accordance with the first aspect of the present invention comprises the steps of receiving data transmitted from another communication device, determining whether a data transmission request is issued from the utilization means, preferentially performing transmission of data based on the data transmission request when receiving data in the step of receiving and determining that the data transmission request is issued in the step of determining, and transferring the data received in the step of receiving to the utilization means after finishing the transmission in the step of preferentially performing.

As stated above, according to the first aspect, the control means determines whether a data transmission request is occurring in its own communication device at the time when it receives data from another communication device. When a data transmission request is occurring, the control means transmits the transmission-requested data to another communication device before transferring the received data to the utilization means. This eliminates communication delay corresponding to the time the utilization means takes to process the received data, thus improving the data transfer efficiency.

Preferably, according to a second aspect, further to the first aspect, the data used in the communication may be data of which the utilization means expects a real-time property, such as audio data or moving picture data. The effect of the first aspect can most effectively be demonstrated to data like audio data and moving picture data which seriously require the real-time property.

A third aspect is directed to a communication frame generating method for generating a communication frame used in communication in a communication device in an asynchronous communication system. The method in accordance with the third aspect of the present invention comprises the steps of generating a start flag indicating the beginning of the communication frame and an end flag indicating the end of the communication frame, obtaining or generating particular information stored between the start flag and the end flag in such a way that information which the communication device can arbitrarily set in the particular information does not contain any code identical to the flag codes of the start and end flags, and forming the communication frame on the basis of the start flag, the end flag, and the particular information.

As stated above, according to the third aspect, information which can arbitrarily be set by the communication device in particular information in the communication frame is generated to exclude the same codes as flag codes of the start and end flags. In transparency control performed after the generation of the communication frame, this reduces the number of transparency-processed codes. This suppresses expansion of the length of the communication frame after the transparency control, thus preventing deterioration of the data transmission (transfer) efficiency.

Preferably, according to a fourth aspect, the step of obtaining or generating the particular information in the third aspect may comprise generating an arbitrary code of a predetermined number of bits by using random numbers, and when the arbitrary code contains any code identical to the flag codes, repeatedly generating an arbitrary code by using random numbers, and determining the arbitrary code which does not contain any code identical to the flag codes as information to be generated.

Also preferably, according to a fifth aspect, the step of obtaining or generating the particular information in the third aspect may comprise generating an arbitrary code of a predetermined number of bits by using random numbers, and when the arbitrary code contains any code identical to the flag codes, converting the identical code to another predetermined code different from the flag codes, and determining the arbitrary code which does not contain any code identical to the flag codes as information to be generated.

More preferably, according to sixth to eighth aspects, the information which the communication device can arbitrarily set in the particular information in the third to fifth aspects may be address information used for identification of the communication device.

A ninth aspect is directed to a recording medium containing a data communication program for use in a communication device performing data communication by half duplex communication system and having utilization means for executing application processing and control means for executing communication protocol processing, the data communication program being executed in the control means, and the data communication program being computer-readable and for realizing on the communication device an operational environment. The operational environment in accordance with the ninth aspect of the present invention comprises the steps of receiving data transmitted from another communication device, determining whether a data transmission request is issued from the utilization means, when receiving data in the step of receiving and determining that the data transmission request is issued in the step of determining, preferentially performing transmission of data based on the data transmission request and after finishing the transmission in the step of preferentially performing, transferring the data received in the step of receiving to the utilization means.

Preferably, according to a tenth aspect, further to the ninth aspect, the data used in the communication may be data of which the utilization means expects a real-time property, such as audio data or moving picture data.

An eleventh aspect is directed to a recording medium on which a program executed in a communication device in an asynchronous communication system and for generating a communication frame used in communication is recorded, the program being computer-readable and for realizing on the communication device an operational environment. The operational environment in accordance with the eleventh aspect of the present invention comprises the steps of generating a start flag indicating the beginning of the communication frame and an end flag indicating the end of the communication frame, obtaining or generating particular information stored between the start flag and the end flag in such a way that information which the communication device can arbitrarily set in the particular information does not contain any code identical to the flag codes of the start and end flags and forming the communication frame on the basis of the start flag, the end flag, and the particular information.

Preferably, according to a twelfth aspect, further to the eleventh aspect, the step of obtaining or generating the particular information may comprise generating an arbitrary code of a predetermined number of bits by using random numbers, and when the arbitrary code contains any code identical to the flag codes, repeatedly generating an arbitrary code by using random numbers and determining the arbitrary code which does not contain any code identical to the flag codes as information to be generated.

Also preferably, according to a thirteenth aspect, further to the eleventh aspect, the step of obtaining or generating the particular information may comprise generating an arbitrary code of a predetermined number of bits by using random numbers, and when the arbitrary code contains any code identical to the flag codes, converting the identical code to another predetermined code different from the flag codes and determining the arbitrary code which does not contain any code identical to the flag codes as information to be generated.

More preferably, according to fourteenth to sixteenth aspects, further to the eleventh to thirteenth aspects, the information which the communication device can arbitrarily set in the particular information may be address information used for identification of the communication device.

As stated above, the ninth to sixteenth aspects are directed to recording medium on which program for executing the data communication method and the communication frame generating method of the first to eighth aspects are recorded. This allows supply of the data communication method and the communication frame generating method of the first to eighth aspects in the form of software to an arbitrary communication device.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the structure of a communication device using a data communication method according to a first embodiment of the present invention.

FIG. 3 is a diagram showing an example of a communication sequence performed between communication devices A and B using the data communication method of the first embodiment of the present invention.

DESCRIPTION OF THE PREFERRED EMBODIMENTS

First Embodiment

First, a data communication method of the present invention will be described as a first embodiment.

FIG. 1 is a block diagram showing the structure of a communication device using the data communication method of the first embodiment of the present invention. In FIG. 1, the communication device using the data communication method of the first embodiment of the invention includes a utilization portion 1, a control portion 2, and a CPU 3.

The utilization portion 1 is the part corresponding to communication application, which sends a data transmission request to the control portion 2, and obtains received data from the control portion 2 and processes the data. The utilization portion 1 is not specified to any service on communication protocol. That is to say, the user can use an arbitrary application program in the utilization portion 1. The control portion 2 is the part corresponding to the communication protocol, which provides control by receiving the data transmission request from the utilization portion 1 and transmitting the data, receiving data from another communication device and transferring the data to the utilization portion 1, etc. The control portion 2 performs data communication between communication devices according to the half duplex communication system. The CPU 3 controls the entire communication device.

In typical hardware environment, the utilization portion 1 and the control portion 2 are composed of storage devices (ROM, RAM, hard disk, etc.) containing given program data. In this case, the functions executed by the control portion 2 are provided in the form of independent program data. The program data may be introduced through a recording medium such as a CD-ROM, a floppy disk, etc., or may be introduced by communication.

Figure 2:
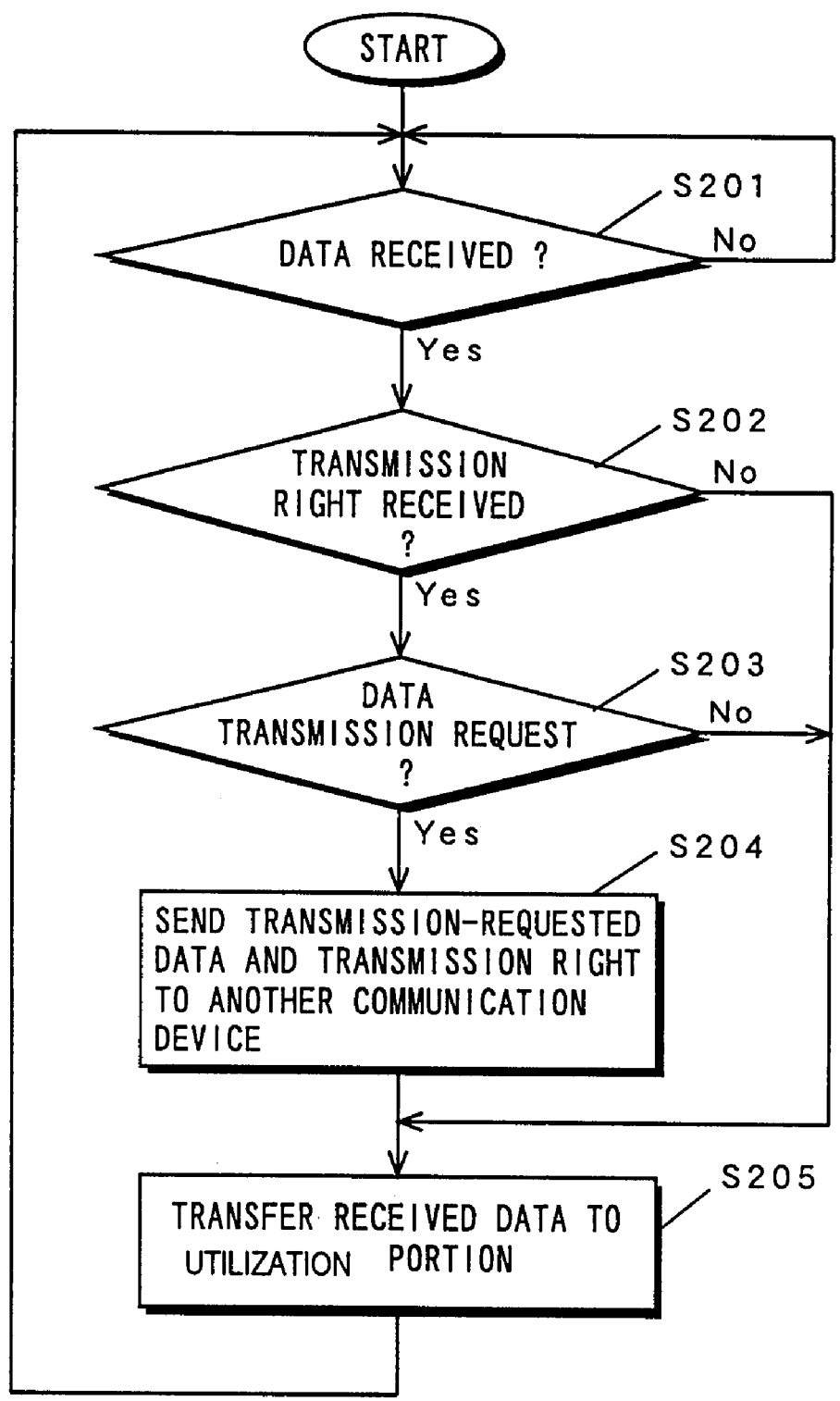
FIG. 2 is a flowchart showing an example of a communication protocol processing performed by the control portion 2 in FIG. 1.

The data communication method of the first embodiment of the present invention will now be described referring to FIGS. 2 and 3. FIG. 2 is a flowchart showing an example of a communication protocol processing performed by the control portion 2. FIG. 3 is a diagram showing an example of a communication sequence performed between communication devices A and B.

First, referring to FIG. 2, the control portion 2 determines whether data is received from another communication device. When the determination made in step S201 shows reception of data, the control portion 2 further determines whether a transmission right is also received. The determination in step S201 is repeatedly made until data is received from another communication device.

When the determination made in step S202 shows that the transmission right is not received, the control portion 2 soon transfers the data received from another communication device to the utilization portion 1. When the determination in step S202 shows reception of the transmission right, the control portion 2 further determines whether a data transmission request is occurring in its own communication device.

When the determination in step S203 shows absence of the data transmission request, the control portion 2 soon transfers the data received from another communication device to the utilization portion 1. When the determination in step S203 shows occurrence of the data transmission request, the control portion 2 first transmits the transmission-requested data (and the transmission right) to another communication device. Then, after the data transmission to another communication device has been finished, the control portion 2 transfers the received data to the utilization portion 1.

Next, referring to FIG. 3, the communication sequence performed by communication devices using the data communication method of the first embodiment of the present invention will be specifically described. In FIG. 3, it is assumed that, in the initial state, the transmission right resides in the communication device A and that a transmission request for data B is occurring in the communication device B. In FIG. 3, the utilization portion in the communication device A is represented as "utilization portion A" and its control portion as "control portion A," and the utilization portion of the communication device B is represented as "utilization portion B" and its control portion as "control portion B."

First, the control portion A transmits only the transmission right to the control portion B since no data transmission request is now present in itself. The control portion B receives the transmission right sent from the control portion A, obtains the transmission-requested data B from the utilization portion B, and then transmits it with the transmission right to the control portion A. The control portion A receives the data B and transmission right sent from the control portion B.

At the time when receiving the data B and the transmission right, the control portion A is receiving a transmission request for data A from the utilization portion A. Accordingly the control portion A first obtains the transmission-requested data A from the utilization portion A and transmits it to the control portion B together with the transmission right. After transmitting the data A, the control portion A transfers the received data B to the utilization portion A. The utilization portion A receives the transferred data B and starts processing.

As described above, according to the data communication method of the first embodiment of the present invention, the control portion determines whether a data transmission request is occurring in its own communication device at the time when it receives data from another communication device. When a data transmission request is occurring, the control portion transmits the data of the data transmission request to another communication device before transferring the received data to the utilization portion. This eliminates the transmission delay corresponding to the time required for the utilization portion to process the received data, leading to improvement of the data transmission efficiency. This allows constructions of systems with lower communication rates than conventional ones in communication systems requiring guarantee of communication bands. Also, the data communication method of the invention is especially effective in systems for communicating audio data, moving picture data, etc. which seriously require the real-time property.

Steps S201 to S203 in the flowchart of FIG. 2 showing processing performed by the control portion 2 may be performed in a different order from that shown in the diagram. That is to say, as long as it receives data and the transmission right from another communication device and executes step S204 only when a data transmission request exists in itself, the order of steps S201 to S203 may be changed.

Second Embodiment

Next, a communication frame generating method of the present invention will now be described as a second embodiment. While the communication frame generating method of the invention can be used in asynchronous communication systems whether they communicate by radio or by wire, an application to an Infrared Data Association (IrDA) system is described by way of example.

Figure 4:
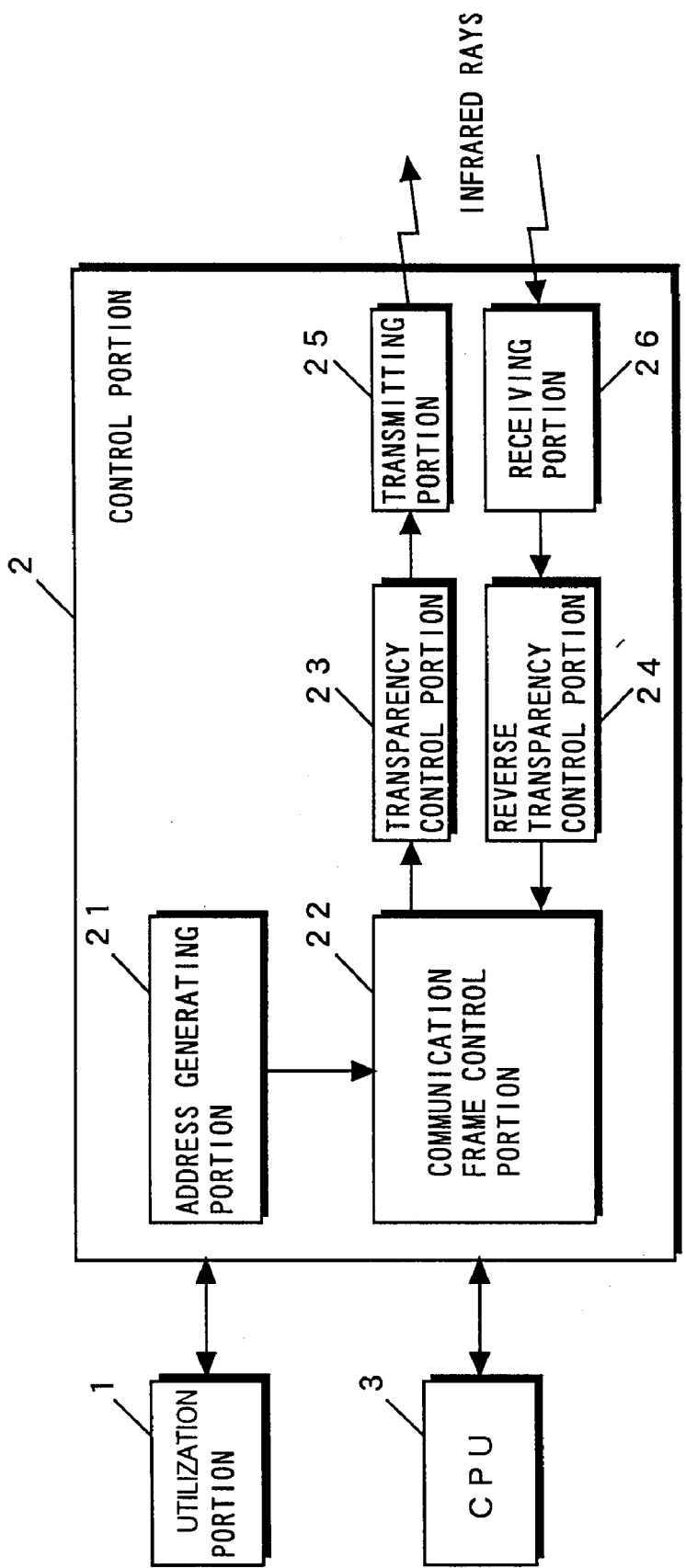
FIG. 4 is a block diagram showing the structure of a communication device using a communication frame generating method according to a second embodiment of the present invention.

FIG. 4 is a block diagram showing the structure of a communication device using the communication frame generating method of the second embodiment of the present invention. In FIG. 4, the communication device using the communication frame generating method of the second embodiment of the invention includes a utilization portion 1, a control portion 2, and a CPU 3. The control portion 2 includes an address generating portion 21, a communication frame control portion 22, a transparency control portion 23, a reverse transparency control portion 24, a transmitting portion 25, and a receiving portion 26.

The utilization portion 1 is the part corresponding to communication application, which sends requests for data transmission etc. to the control portion 2. The control portion 2 is the part corresponding to communication protocol, which receives requests from the utilization portion 1 to provide control by finding a communication device, opening a link, transmitting/receiving data, etc. The address generating portion 21 generates connection addresses used as identification codes in communication with other communication devices by using random numbers. The communication frame control portion 22 generates communication frames in transmission, and analyzes received communication frames in reception. The transparency control portion 24 applies transparency control to the communication frames generated in the communication frame control portion 22. The reverse transparency control portion 24 cancels transparency control applied to communication frames received. The transmitting portion 25 transmits communication frames after transparency control to other communication devices. The receiving portion 26 receives communication frames transmitted from other communication devices and outputs the communication frames to the reverse transparency control portion 24. The CPU 3 controls the entirety of the communication device.

As mentioned above, in typical hardware environment, the utilization portion 1 and the control portion 2 are composed of storage devices (ROM, RAM, hard disk, etc.) containing given program data. In this case, the functions performed by the control portion 2 are provided in the form of independent program data. The program data may be introduced through a recording medium such as a CD-ROM, floppy disk, etc., or may be introduced through communication.

First, operation of IrDA communication between the above communication devices will briefly be described.

A communication device desiring to make a communication (hereinafter referred to as a starting station) finds another communication device as an object of the communication (hereinafter referred to as an answering station) and opens a link. Subsequently, the starting station arbitrarily sets a connection address used as an identification code in the communication. This connection address is an element included in the communication frame described later, together with information for connecting processing, user data, etc. The starting station then stores the connection address in the communication frame and transmits the communication frame, and the answering station identifies the connection address and receives and processes the communication frame only when it is destined to itself.

Figure 5:
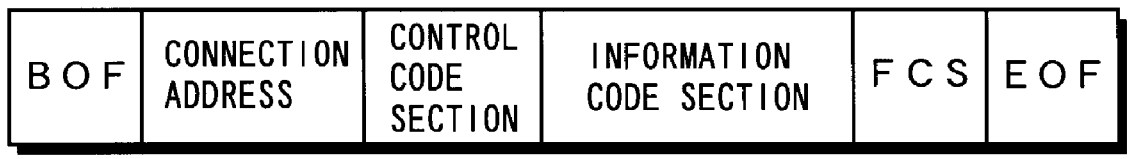
FIG. 5 is a diagram showing the structure of a communication frame in the case of communication rates of 115.2 kbps or lower in IrDA communication standard.

Next, the structure of the communication frame in IrDA communication standard will be described referring to FIG. 5. FIG. 5 is a diagram showing the structure of a communication frame generated in the communication frame control portion 22 (in the case of communication rates of 115.2 kbps or lower).

Referring to FIG. 5, the communication frame includes, from its beginning, a BOF (Beginning Of Frame), connection address, control code section, information code section, FCS (Frame Check Sequence), and EOF (End Of Frame). The BOF is a flag indicating the beginning of the communication frame. The control code section contains codes indicating type and order number of the data stored. The information code section contains user data. The FCS contains a code for error detection. The EOF is a flag indicating the end of the communication frame.

In the structure of the communication frame, BOF and EOF are important flags for identifying the communication frame, and the codes used in the BOF and EOF flags should not exist in other codes. Hence, if the same codes as the BOF and EOF flag codes exist in the codes of the connection address, control code section, information code section, and FCS, the overlapping codes must previously be avoided by the transparency control described in the background art.

While the codes other than the connection address cannot freely be set (or changed) by the communication device according to the IrDA communication system standard or an instruction from the user, the connection address can freely be set between the starting station and answering station when opening the link between the communication devices as described above. Accordingly, for the connection address, the application of the transparency control itself can be avoided in advance by setting it in such a way that it does not include the same codes as the BOF and EOF flag codes.

Figure 6:
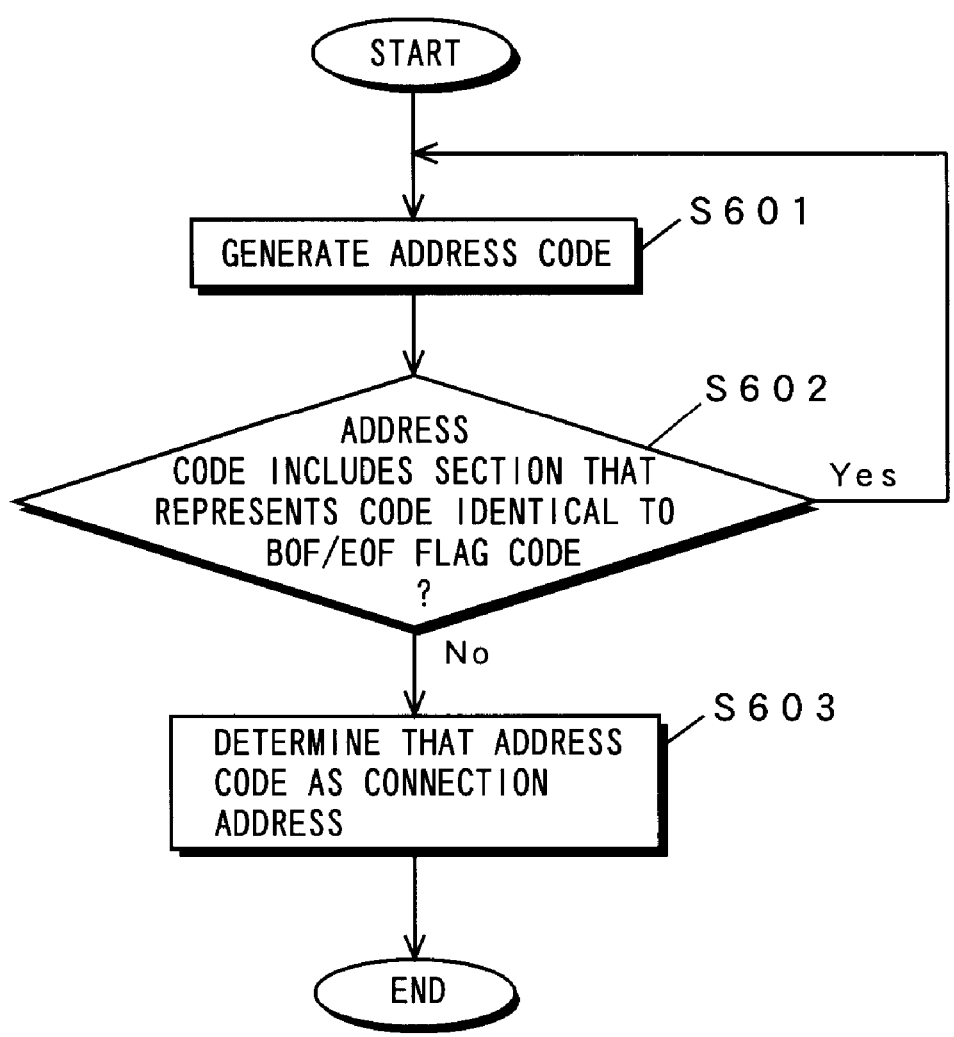
FIG. 6 is a flowchart showing an example of a connection address generating method performed by the address generating portion 21 of FIG. 4.
Figure 7:
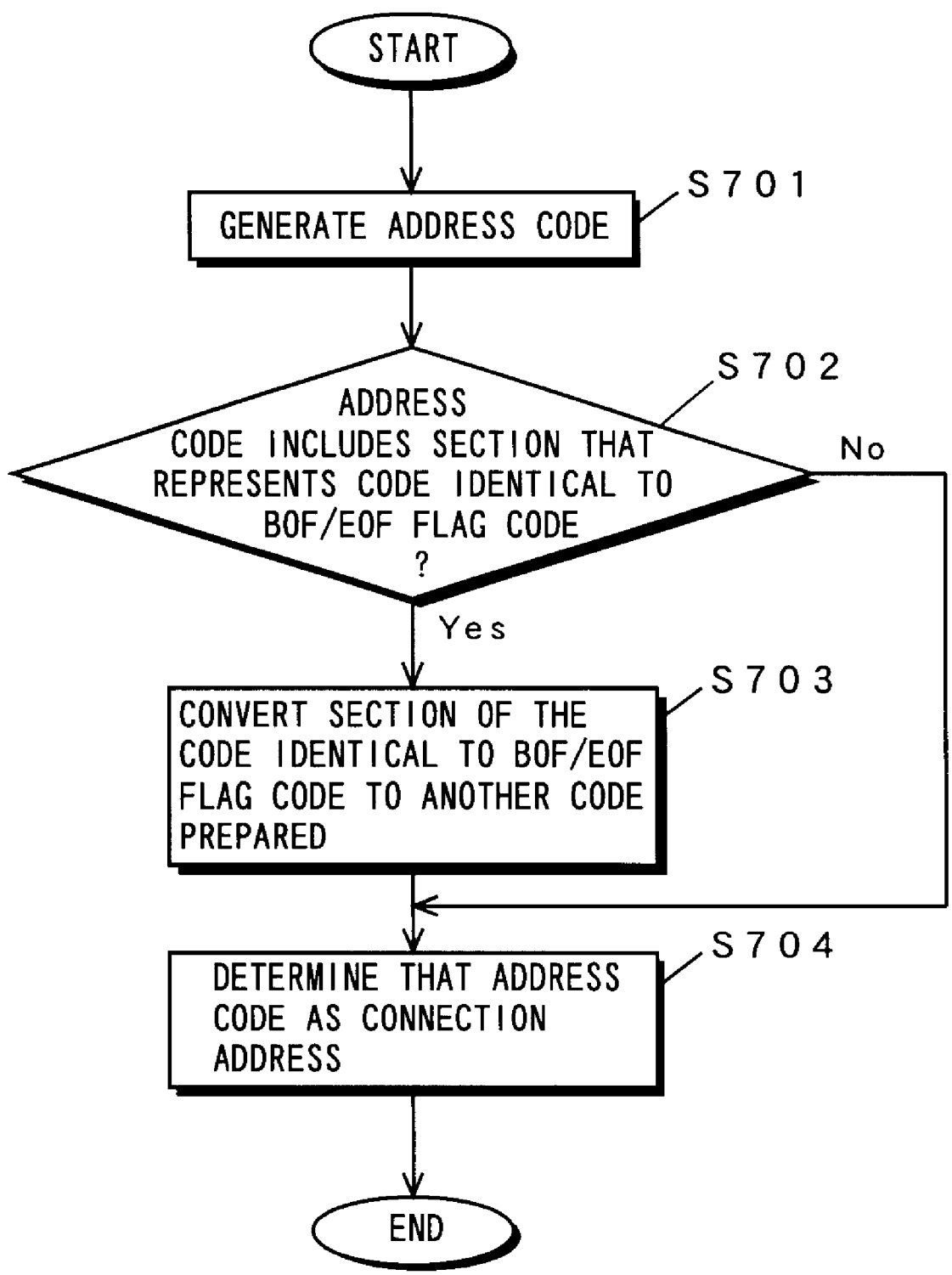
FIG. 7 is a flowchart showing an example of the connection address generating method performed by the address generating portion 21 of FIG. 4.
Figure 8:
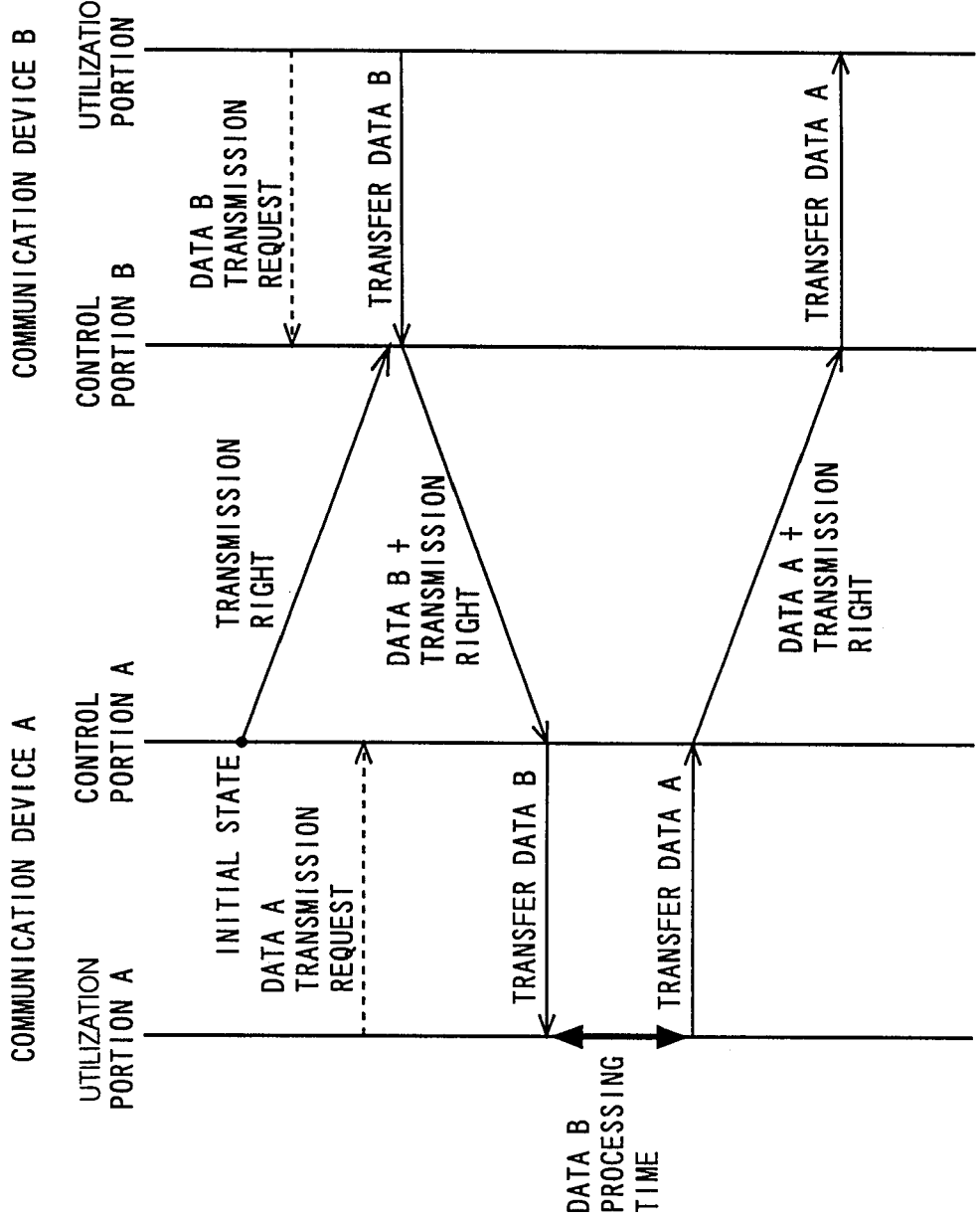
FIG. 8 is a diagram showing an example of a communication sequence performed between communication devices A and B using a conventional data communication method.
Figure 9:
FIG. 9 is a diagram showing an example of the structure of a communication frame used in an asynchronous communication system.

The communication frame generating method of the second embodiment of the invention for setting the connection address to exclude the same codes as the BOF and EOF flag codes will now be described referring to FIGS. 6 and 7. FIGS. 6 and 7 are flowcharts each showing an example of the connection address generating method performed in the address generating portion 21 of FIG. 4.

Now, a first method will be described referring to FIG. 6.

The address generating portion 21 arbitrarily generates an address code as the connection address by using random numbers S601 Then the address generating portion 21 determines whether the generated address code includes any section representing a code identical to the BOF or EOF flag code. When the determination made in step S602 shows that it includes a section of the same code, the address generating portion 21 returns to step S601 to generate an address code again. When the determination in step S602 shows absence of the same codes (or when the same section has been omitted), the address generating portion 211 determines the address code as the connection address.

Next, another method will be described referring to FIG. 7.

The address generating portion 21 arbitrarily generates an address code as the connection address by using random numbers S701. Then the address generating portion 21 determines whether the generated address code includes any section representing the same code as the BOF or EOF flag code. When the determination made in step S702 shows that it includes the same code section, the address generating portion 21 converts the same code section in the address code to another code prepared in advance. Then the address generating portion 21 determines the address code after converted as the connection address. When the determination in step S702 shows that it does not contain any same code section, the address generating portion 21 determines that address code unchanged as the connection address. In the conversion performed in step S703, both of a part representing the same code as the BOF flag code and a part representing the same code as the EOF flag code may be converted to another same code, or may be converted into different codes.

When the address generating portion 21 performs this processing, it is possible to generate a special connection address not including the same codes as the BOF and EOF flag codes. Using a communication frame containing this special connection address in the communication prevents excessive application of the transparency control.

As described above, according to the communication frame generating method of the second embodiment of the invention, sections representing the same codes as the BOF and EOF flag codes are converted into other codes in the process of generating the connection address. This reduces the number of codes to be subjected to the transparency processing in the transparency control after the generation of the communication frame. This suppresses extension of the length of the communication frame after transparency control, thus preventing deterioration of the data transmission (transfer) efficiency.

The second embodiment has explained the IrDA communication system as an example. Accordingly the description was limited to the conversion of the connection address which is the only part the communication device can freely set in the IrDA communication system. However, as stated above, the present invention can be used in asynchronous communication systems whether by radio or by wire. Hence, the communication frame generating method of the invention can similarly be applied to any parts that the communication devices can freely set, as well as to the address section for identification, also in asynchronous communication systems other than IrDA communication.

Further, needless to say, the communication frame generating method of the second embodiment can be applied to generation of communication frames used in the data communication method of the first embodiment, and also to the generation of communication frames used in other data communication methods.

While the invention has been described in detail, the foregoing description is in all aspects illustrative and not restrictive. It is understood that numerous other modifications and variations can be devised without departing from the scope of the invention

What is claimed is:

1. A communication frame generating method for generating a communication frame used for communication in a communication device in an asynchronous communication system, said method comprising:

generating a start flag indicating the beginning of the communication frame and an end flag indicating the end of the communication frame;

generating particular information stored between the start flag and the end flag by converting only a code identical to the flag codes of the start or end flags, which is included in information which the communication device can arbitrarily set in the particular information, to a code different from the flag codes; and forming the communication frame based on the start flag, the end flag and the particular information.

2. The communication frame generating method according to claim 1, wherein said generating the particular information comprises, generating an arbitrary code of a predetermined number of bits by using random numbers, and when the arbitrary code contains any code identical to the flag codes, repeatedly generating an arbitrary code by using random numbers, and determining the arbitrary code which does not contain any code identical to the flag codes as a code different from the flag codes.

3. The communication frame generating method according to claim 1, wherein said generating the particular information comprises generating an arbitrary code of a predetermined number of bits by using random numbers, and when the arbitrary code contains any code identical to the flag codes, converting the identical code to another predetermined arbitrary code different from the flag codes, and determining the arbitrary code which does not contain any code identical to the flag codes as a code different from the flag codes.

4. The communication frame generating method according to claim 1, wherein the information which the communication device can arbitrarily set in the particular information comprises address information used for identification of the communication device.

5. The communication frame generating method according to claim 2, wherein the information which the communication device can arbitrarily set in the particular information comprises address information used for identification of the communication device.

6. The communication frame generating method according to claim 3, wherein the information which the communication device can arbitrarily set in the particular information comprises address information used for identification of the communication device.

7. A recording medium on which a program executed in a communication device in an asynchronous communication system and for generating a communication frame used in communication is recorded, the program being computer-readable and for realizing on the communication device an operational environment comprising:

generating a start flag indicating the beginning of the communication frame and an end flag indicating the end of the communication frame;

generating particular information stored between the start flag and the end flag by converting only a code identical to the flag codes of the start or end flags, which is included in information which the communication device can arbitrarily set in the particular information, to a code different from the flag codes; and forming the communication frame based on the start flag, the end flag and the particular information.

8. The recording medium according to claim 7, wherein said generating the particular information comprises:

generating an arbitrary code of a predetermined number of bits by using random numbers, and when the arbitrary code contains any code identical to the flag codes, repeatedly generating an arbitrary code by using random numbers, and determining the arbitrary code which does not contain any code identical to the flag codes as a code different from the flag codes.

9. The recording medium according to claim 7, wherein said generating the particular information comprises:

generating an arbitrary code of a predetermined number of bits by using random numbers, and when the arbitrary code contains any code identical to the flag codes, converting the identical code to another predetermined arbitrary code different from the flag codes, and determining the arbitrary code which does not contain any code identical to the flag codes as a code different from the flag codes.

10. The recording medium according to claim 7, wherein the information which the communication device can arbitrarily set in the particular information comprises address information used for identification of the communication device.

11. The recording medium according to claim 8, wherein the information which the communication device can arbitrarily set in the particular information comprises address information used for identification of the communication device.

12. The recording medium according to claim 9, wherein the information which the communication device can arbitrarily set in the particular information comprises address information used for identification of the communication device.

13. A communication frame generating method for generating a communication frame used for communication in a communication device in an asynchronous communication system, said method comprising:

generating a start flag indicating the beginning of the communication frame and an end flag indicating the end of the communication frame;

generating particular information stored between the start flag and the end flag in such a way that information which the communication device can arbitrarily set in the particular information does not contain any code identical to the flag codes of the start or end flags; and forming the communication frame based on the start flag, the end flag and the particular information.

14. A recording medium on which a program executed in a communication device in an asynchronous communication system and for generating a communication frame used in communication is recorded, the program being computer-readable and for realizing on the communication device an operational environment comprising:

generating a start flag indicating the beginning of the communication frame and an end flag indicating the end of the communication frame;

generating particular information stored between the start flag and the end flag in such a way that information which the communication device can arbitrarily set in the particular information does not contain any code identical to the flag codes of the start or end flags; and forming the communication frame on the basis of the start flag, the end flag, and the particular information.

\* \* \* \* \*